United States Patent
Wu

(10) Patent No.: US 7,374,698 B2
(45) Date of Patent: May 20, 2008

(54) NANOMETER HEAT-CONDUCTING WATER SOLUTION FOR USE IN CAR COOLING SYSTEM

(76) Inventor: Ching-Jung Wu, 1st Floor, No. 3, Lane 7, Shou Chang Street, Taoyuan (TW)

( * ) Notice: Subject to any disclaimer, the term of this patent is extended or adjusted under 35 U.S.C. 154(b) by 448 days.

(21) Appl. No.: 11/037,175

(22) Filed: Jan. 19, 2005

(65) Prior Publication Data

US 2006/0157669 A1 Jul. 20, 2006

(51) Int. Cl.
*C09K 3/18* (2006.01)
*C09K 5/00* (2006.01)

(52) U.S. Cl. ............... 252/70; 252/71; 252/74; 165/104.19; 516/33

(58) Field of Classification Search .......... 252/71, 252/70, 73, 76, 79, 74; 165/104.19, 104.15, 165/10, 104; 118/715
See application file for complete search history.

(56) References Cited

U.S. PATENT DOCUMENTS

| | | | | |
|---|---|---|---|---|
| 5,047,203 | A * | 9/1991 | Miyata et al. | 376/310 |
| 5,100,571 | A * | 3/1992 | Hartman | 252/75 |
| 5,718,836 | A * | 2/1998 | Nakatani et al. | 252/74 |
| 6,221,275 | B1 * | 4/2001 | Choi et al. | 252/74 |
| 6,432,320 | B1 * | 8/2002 | Bonsignore et al. | 252/70 |
| 6,695,974 | B2 * | 2/2004 | Withers et al. | 252/70 |
| 6,858,157 | B2 * | 2/2005 | Davidson et al. | 252/70 |
| 2005/0062015 | A1 * | 3/2005 | Kobori | 252/71 |
| 2005/0218370 | A1 * | 10/2005 | Egawa et al. | 252/70 |
| 2005/0269548 | A1 * | 12/2005 | Jeffcoate et al. | 252/71 |
| 2006/0199011 | A1 * | 9/2006 | Jahns | 428/402.24 |

OTHER PUBLICATIONS

Netsu Bussei, "Alteration of Thermal Conductivity and Viscosity of Liquid by Dispersing Ultra-Fine Particles (Dispersion of $Al_2O_3$, $SiO_2$, and $TiO_2$ Ultra-Fine Particles)", 7 (4) (1993) pp. 227-233.*

* cited by examiner

*Primary Examiner*—Mark Kopec
*Assistant Examiner*—Khanh Tuan Nguyen
(74) *Attorney, Agent, or Firm*—Troxell Law Office, PLLC

(57) ABSTRACT

A nanometer heat-conducting water solution for use in a car cooling system is disclosed. The nanometer heat-conducting water solution is formed by mixing a $AlO_2$ solution (1.1 vol %) having 3-10 nanometer scale materials with a $TiO_2$ solution (1.1 vol %) having 3-10 nanometer scale materials, wherein the obtained solution is then mixed with a diluent (93 vol %), and dispersing agents (3.43 vol %) and an emulsifying agent (1.37 vol %) are thereafter added so as to disperse the $AlO_2$ solution and the $TiO_2$ solution in the diluent uniformly. When the obtained stable nanometer heat-conducting water solution is added to a water tank of the car, the $TiO_2$ cleans limescale and the emulsifying agent adheres to wall surfaces of water jackets to allow $AlO_2$ to release energy continuously. Moreover, the nanometer scale materials speed up the micro-explosion of the cooling water so as to optimum the cooling effect and increase the heat-dispersing efficacy significantly.

2 Claims, No Drawings

NANOMETER HEAT-CONDUCTING WATER SOLUTION FOR USE IN CAR COOLING SYSTEM

FIELD OF THE INVENTION

The present invention relates to a nanometer heat-conducting water solution for use in a car cooling system.

BACKGROUND OF THE INVENTION

A cooling system of a car is composed of a cylinder block, water jackets of a cylinder head, a water pump, a fan, a radiator (water tank), and a thermostat. The purpose of this cooling system is to disperse the unused thermal energy to allow the engine to perform working in a normal temperature. Moreover, the engine body and its surrounding components can be therefore cooled down. The breakdown of the cooling system of the car engine comes with the following circumstances:

1. The overheated engine results in interrupted oil film and powerless engine.
2. The overheated engine causes the lubricating oil insufficient viscosity index, which induces car shake.
3. The overheated engine brings about electric leakage and electrode eroding on the ignition system.
4. The overheated engine causes the fuel system vapor lock, which induces carbon deposits, explosion vibration, and powerless engine due to incomplete burning of gasoline.
5. The overheated engine makes the surrounding components of the engine overheated, which generates resonance noise.

The above-mentioned circumstances result in numerous problems, for example, gas guzzling, noise, etc. Accordingly, there is a need to provide a cooling system to cool down the overheated engine.

Furthermore, the cooling function of the cooling system is achieved by use of the water pump to perform the pressure type forced heat-dispersing circulation. Accordingly, the water tank is the most important component of the cooling system, and it plays a very important role. Even though the water tank can be enlarged to promote the heat-dispersing efficacy, the existing water tank is confined to its original fixing mode and required mounting space. Consequently, in order to promote the cooling efficacy of the water tank, the most concrete method is to change the content of the water tank for speeding up its cooling rate.

The most common method at present is to add anti-rust additives mostly with anti-freezing function to prevent the pipelines and water jackets of the cooling system from obstruction, which results from metal rust or limescale formed thereon after long-term use and reduces the amount of the circular cooling water solution and the cooling efficacy. However, the cooling efficacy is not brought into full play in accordance with this kind of anti-rust additives addition method for altering the content of the water tank. Consequently, there are required significant originality and variation to further alter the content of the water tank for speeding up the cooling rate.

SUMMARY OF THE INVENTION

The present inventor has been made diligent studies with a quiet mind to provide a nanometer heat-conducting water solution for use in a car cooling system by combining the new generation of nanometer scale materials and the dispersing technology thereby promoting the heat-dispersing efficacy of the car cooling system. The nanometer heat-conducting water solution is disclosed for satisfying industrial requirements.

The present invention discloses a nanometer heat-conducting water solution for use in a car cooling system, which is formed by mixing a $AlO_2$ solution (1.1 vol %), a $TiO_2$ solution (1.1 vol %), a diluent (93 vol %), dispersing agents (3.43 vol %), and an emulsifying agent (1.37 vol %) so as to form a stable nanometer heat-conducting water solution. When this stable nanometer heat-conducting water solution is added to a water tank of the car, the $TiO_2$ cleans limescale and the emulsifying agent adheres to wall surfaces of water jackets to allow $AlO_2$ to release energy continuously. Moreover, the nanometer scale materials speed up the micro-explosion of the cooling water so as to optimum the cooling effect and increase the heat-dispersing efficacy significantly.

DETAILED DESCRIPTION OF THE PREFERRED EMBODIMENT

The present invention discloses a nanometer heat-conducting water solution for use in a car cooling system, which is formed by mixing a $AlO_2$ solution (1.1 vol %) having 3-10 nanometer scale materials with a $TiO_2$ solution (1.1 vol %) having 3-10 nanometer scale materials. This obtained solution is then mixed with a diluent (93 vol %). Thereafter, dispersing agents (3.43 vol %) and an emulsifying agent (1.37 vol %) are added so as to disperse the $AlO_2$ solution and the $TiO_2$ solution in the diluent uniformly for forming a stable nanometer heat-conducting water solution.

When this stable nanometer heat-conducting water solution is added to a water tank of the car, the TiO2 cleans limescale and the emulsifying agent adheres to wall surfaces of water jackets to allow $AlO_2$ to release energy continuously. Moreover, the nanometer scale materials speed up the micro-explosion of the cooling water so as to optimum the cooling effect and increase the heat-dispersing efficacy significantly.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments, which do not depart from the spirit and scope of the invention.

What the invention claimed is:

1. A nanometer heat-conducting water solution for use in a car cooling system, which is formed by mixing a $AlO_2$ solution (1.1 vol %) having 3-10 nanometer scale materials with a $TiO_2$ solution (1.1 vol %) having 3-10 nanometer scale materials, wherein the obtained solution is then mixed with a diluent (93 vol %), and dispersing agents (3.43 vol %) and an emulsifying agent (1.37 vol %) are thereafter added so as to disperse the $AlO_2$ solution and the $TiO_2$ solution in the diluent uniformly for forming the stable nanometer heat-conducting water solution.

2. The nanometer heat-conducting water solution for use in the car cooling system of claim 1, wherein the diluent is a water solution.

\* \* \* \* \*